United States Patent
Tuttle et al.

(10) Patent No.: US 8,531,298 B2
(45) Date of Patent: Sep. 10, 2013

(54) FLEXIBLE RFID LABEL

(75) Inventors: Mark E. Tuttle, Boise, ID (US); Roy Greeff, Boise, ID (US); Freddie W. Smith, Caldwell, ID (US); John R. Tuttle, Boulder, CO (US)

(73) Assignee: Round Rock Research, LLC, Jersey City, NJ (US)

( * ) Notice: Subject to any disclaimer, the term of this patent is extended or adjusted under 35 U.S.C. 154(b) by 0 days.

(21) Appl. No.: 13/052,765

(22) Filed: Mar. 21, 2011

(65) Prior Publication Data

US 2011/0253792 A1  Oct. 20, 2011

Related U.S. Application Data

(63) Continuation-in-part of application No. 12/121,357, filed on May 15, 2008, now abandoned.

(51) Int. Cl.
*G08B 13/14* (2006.01)

(52) U.S. Cl.
USPC .............. 340/572.7; 340/572.1; 343/867; 343/742; 343/741; 343/866

(58) Field of Classification Search
USPC ....... 340/572.1, 572.8, 572.7, 10.1; 343/867, 343/742, 741, 866; 235/435, 492
See application file for complete search history.

(56) References Cited

U.S. PATENT DOCUMENTS

| | | | |
|---|---|---|---|
| 5,604,485 A | 2/1997 | Lauro et al. | |
| 6,069,564 A * | 5/2000 | Hatano et al. | 340/572.7 |
| 6,278,413 B1 | 8/2001 | Hugh et al. | |
| 7,005,968 B1 | 2/2006 | Bridgelall | |
| 7,084,740 B2 | 8/2006 | Bridgelall | |
| 7,301,460 B2 | 11/2007 | Coste | |
| 7,400,298 B2 | 7/2008 | Fogg et al. | |
| 7,434,739 B2 | 10/2008 | Matsuura et al. | |
| 7,598,867 B2 | 10/2009 | Carrender | |
| 2002/0130778 A1* | 9/2002 | Nicholson | 340/572.1 |
| 2004/0046663 A1* | 3/2004 | Jesser | 340/572.1 |
| 2005/0093677 A1* | 5/2005 | Forster et al. | 340/10.1 |
| 2005/0128085 A1 | 6/2005 | Bon | |
| 2005/0130389 A1 | 6/2005 | Yamazaki et al. | |
| 2005/0184871 A1 | 8/2005 | Coste | |
| 2006/0187053 A1 | 8/2006 | Koele | |
| 2006/0208900 A1 | 9/2006 | Tavassoli Hozouri | |
| 2006/0237544 A1* | 10/2006 | Matsuura et al. | 235/492 |
| 2007/0029385 A1* | 2/2007 | Kovac et al. | 235/435 |
| 2007/0046475 A1* | 3/2007 | Carrender | 340/572.7 |
| 2007/0152831 A1* | 7/2007 | Eisele | 340/572.7 |
| 2007/0164867 A1 | 7/2007 | Kawai | |
| 2007/0200708 A1* | 8/2007 | Hayama et al. | 340/572.7 |
| 2007/0222602 A1 | 9/2007 | Luo et al. | |
| 2008/0117024 A1* | 5/2008 | Oberle | 340/10.1 |
| 2008/0246614 A1* | 10/2008 | Paananen | 340/572.7 |
| 2009/0284377 A1* | 11/2009 | Tuttle et al. | 340/572.7 |

* cited by examiner

*Primary Examiner* — Hoi Lau
(74) *Attorney, Agent, or Firm* — Lerner, David, Littenberg, Krumholz & Mentlik, LLP (57) ABSTRACT

An RFID tag includes a base having at least one fold formed therein. An integrated circuit is formed on the base. At least one antenna segment extends from the integrated circuit and crosses the fold. When the fold is creased, a portion of the antenna segment on one side of the fold is aligned to be orthogonal to a portion of the antenna segment on the other side of the fold.

11 Claims, 9 Drawing Sheets

FLEXIBLE RFID LABEL

CROSS-REFERENCE TO RELATED APPLICATIONS

This application is a continuation-in-part of U.S. application Ser. No. 12/121,357, filed on May 15, 2008, the disclosure of which is incorporated herein by reference.

BACKGROUND OF THE INVENTION

The present invention relates to radio frequency identification (RFID), and more particularly to a flexible RFID label.

RFID is a technology that incorporates the use of electromagnetic or electrostatic coupling in the radio frequency (RF) portion of the electromagnetic spectrum to uniquely identify an object, animal, or person. With RFID, the electromagnetic or electrostatic coupling in the RF (radio frequency) portion of the electromagnetic spectrum is used to transmit signals. A typical RFID system includes an antenna and a transceiver, which reads the radio frequency and transfers the information to a processing device (reader) and a transponder, or RFID tag, which contains the RF circuitry and information to be transmitted. The antenna enables the integrated circuit to transmit its information to the reader that converts the radio waves reflected back from the RFID tag into digital information that can then be passed on to computers that can analyze the data.

BRIEF SUMMARY OF THE INVENTION

The present invention provides methods and apparatus for a flexible RFID label.

In one aspect, the invention is directed to a radio frequency identification (RFID) tag including an L-shaped base, an integrated circuit, a first antenna segment and a second antenna segment. A first fold is formed in the base to form a first tab on a first free end of the base, and a second fold is formed in the base to form a second tab on a second free end of the base. The first fold is orthogonal to the second fold, and the first tab and the second tab extend from adjacent sides of a main body of the base. The integrated circuit is formed on the main body of the base. A first portion of the first antenna segment is formed on the base and extends from the integrated circuit over the first fold. A second portion of the first antenna segment is formed on the first tab. The second portion of the first antenna orthogonally extends from a free end of the first portion of the first antenna segment to an edge of the first tab. A first portion of the second antenna segment is formed on the base. The first portion of a second antenna segment extends from the integrated circuit over the second fold. The first portion of the second antenna segment is orthogonal to the first portion of the first antenna segment. A second portion of the second antenna segment is formed on the second tab. The second portion of the second antenna segment orthogonally extends from a free end of the first portion of the second antenna segment to an edge of the second tab. The second portion of the second antenna segment is orthogonal to the second portion of the first antenna segment.

In another aspect, the invention is directed to a radio frequency identification (RFID) tag including a base having a fold, an integrated circuit formed on the base, and first and second antenna segments formed on the base. The first antenna segment extends from the integrated circuit over the fold. The second antenna segment extends from the integrated circuit in an opposite direction relative to the first antenna segment.

In another aspect, the invention is directed to a radio frequency identification (RFID) tag includes a base having a fold, an integrated circuit formed on the base, a pair of first antenna segments formed on the base, and a second antenna segment formed on the base on an opposite side of the fold than the integrated circuit. Each first antenna segment extends from the integrated circuit to the fold. The second antenna segment contacts the pair of first antenna segments at the fold at free ends thereof. The pair of first antenna segments and the second antenna segment form a loop antenna.

In another aspect, the invention is directed to a radio frequency identification (RFID) device including an L-shaped base, an integrated circuit, and first and second antennas. A first fold is formed in the base to form a first tab on a first free end of the base, and a second fold is formed in the base to form a second tab on a second free end of the base. The first fold is orthogonal to the second fold, and the first tab and the second tab extend from adjacent sides of a main body of the base. The integrated circuit is formed on the main body of the base. The first antenna extends from the integrated circuit over the first fold. The second antenna extends from the integrated circuit over the second fold, and the second antenna is orthogonal to the first antenna.

In another aspect, the invention is directed to a radio frequency identification (RFID) device including an L-shaped base having a fold is formed therein, an integrated circuit formed on the base, and first and second antennas. The first antenna includes a first segment extending from the integrated circuit and a second segment extending from a free end of the first segment. The first segment contacts the second segment at the fold. The second antenna extends from the integrated circuit, and the second antenna is orthogonal to the first antenna.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

In general, a radio frequency identification (RFID) tag (also referred to as a label or device) is a microchip combined with an antenna in a compact package. The packaging is structured to enable the RFID tag to be attached to an object to be tracked.

The tag's antenna picks up signals from a RFID reader or scanner and then returns the signal, usually with some additional data, such as, for example, a unique serial number or other customized information.

RFID tags can be very small—the size of a large rice grain. Others may be the size of a small paperback book.

In general, a passive tag is a RFID tag that does not contain a battery. The power is supplied by the reader, i.e., the passive tag derives its power from interaction of the antenna and radio waves from the reader.

A tag is an active RFID tag when it is equipped with a battery that can be used as a partial or complete source of power for the tag's circuitry and antenna.

Many hybrid type RFID tags also exist, such as smart tags. These smart tags often include a thin film battery enabling tag flexibility and small form factors.

Antenna polarity in a RFID tag is important because it affects the quality of communication between the RFID interrogator (or scanner) and RFID tag. The RFID interrogator's antenna and the RFID tag's antenna should have the same polarization. If polarization is not realized, a severe loss in signal, along with a drastic decrease in a read range, which results in unsuccessful communication with a RFID tag, can be experienced.

Polarization can be either circular or linear. Linear polarization is relative to the surface of the earth. Linear polarization can also be either horizontal or vertical. Horizontally polarized signals propagate parallel to the earth. Vertically polarized signals propagate perpendicular to the earth.

Antennas with circular polarization can receive signals from both the vertical and horizontal planes by injecting the signal at two points on the antenna radiated slightly out of phase creating a rotating effect on the field. However, there is a slight loss of signal strength, due to the constructive and deconstructive effect of the field being slightly out of phase.

In supply chain applications, portals and tunnels are commonly used configurations. Energizing and reading RFID tags are exercises in probability, in which the probability has to be maximized to increase the likelihood that a given RFID tag will be in the field of a RFID interrogator's signal long enough that it can be read.

Figure 1:
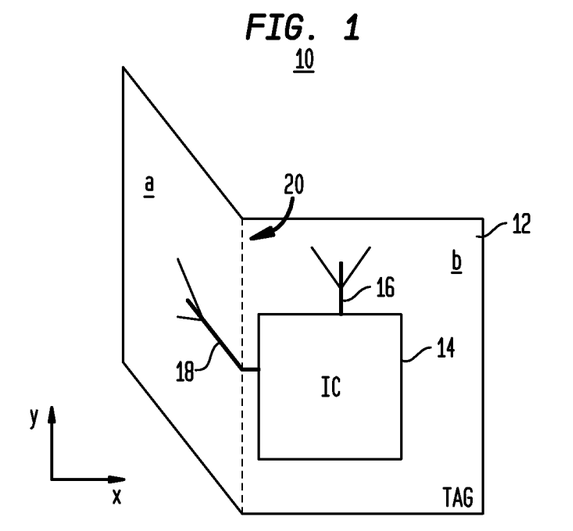
FIG. 1 is a block diagram of an exemplary RFID tag.

As shown in FIG. 1, an exemplary RFID tag 10 includes a base 12. The base 12 can be non-flexible but often the base is flexible or semi-flexible. The base 12 includes an integrated circuit 14. The integrated circuit 14 is coupled to two orthogonal antennas 16, 18. The base 12 includes a crease 20.

When the base 12 is folded along the crease 20, three dimensions of antenna polarity are achieved by having the orthogonal antennas 16, 18 oriented in two planes or lobes a, b. More specifically, folding or bending the base 12 along the antenna 18 at the crease 20 results in a three dimensional configuration wherein a first portion of the antenna 18 lies in an x-axis relative to antenna 16 on a y-axis, all in a first plane (or lobe) b, and a second portion of the antenna 18 lies in a z-axis relative to the x-axis and y-axis, in a second plane (or lobe) a.

Figure 2:
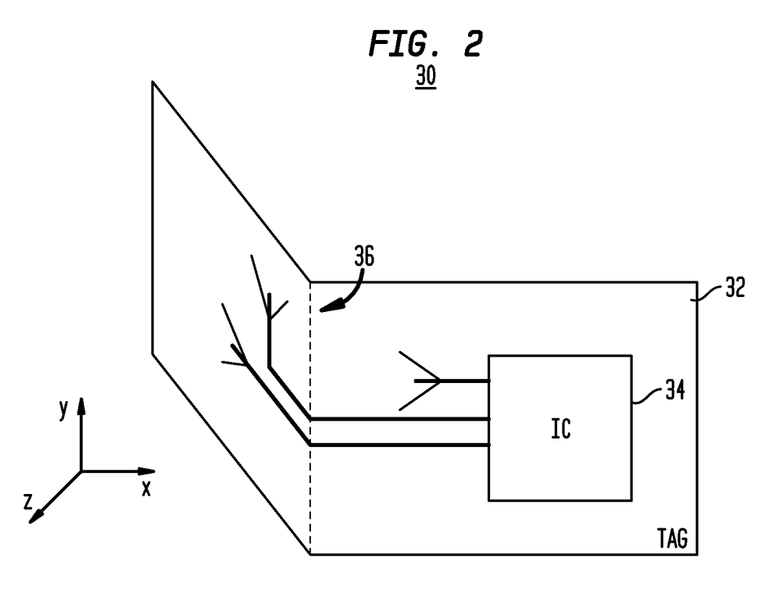
FIG. 2 is a block diagram of an exemplary RFID tag.

As shown in FIG. 2, an exemplary RFID tag 30 includes a base 32. The base 32 includes an integrated circuit 34 and a crease 36. Three orthogonal antennas 38, 40, 42 are coupled to the integrated circuit 34. Bending the base 32 at the crease 36 again results in three dimensions of antenna polarity.

Figure 3A:
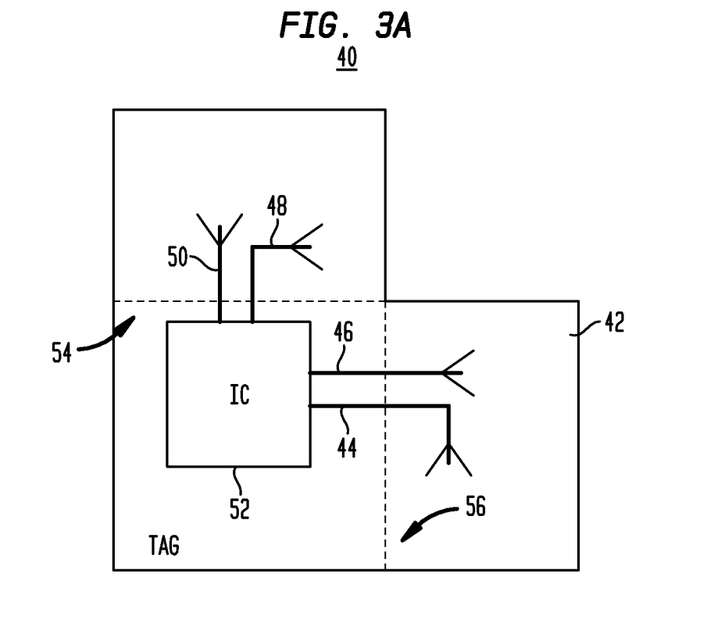
FIGS. 3A and 3B are block diagrams of an exemplary RFID tag.

As shown in FIG. 3A, an exemplary RFID tag 40 includes an L-shaped base 42. The base 42 includes four orthogonal antennas 44, 46, 48, 50 coupled to an integrated circuit 52. The base 42 also includes two creases or folds 54, 56.

Figure 3B:
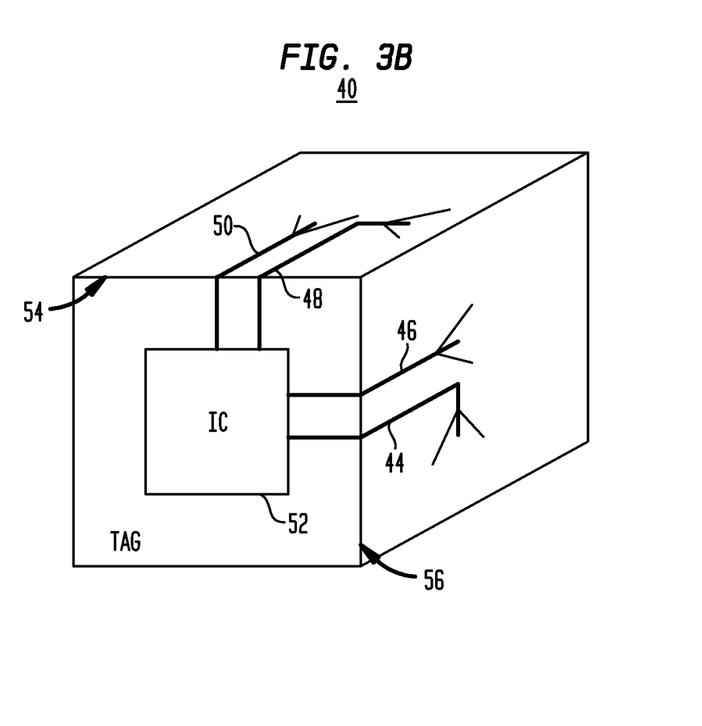

As sown in FIG. 3B, the RFID tag 40 with two bends 54, 56 in the base 42 having four orthogonal antennas 44, 46, 48, 50 is advantageous as a corner cap on a shipping box, for example. The bends 54, 56 can be perforations, folds, creases, and so forth.

Figure 4A:
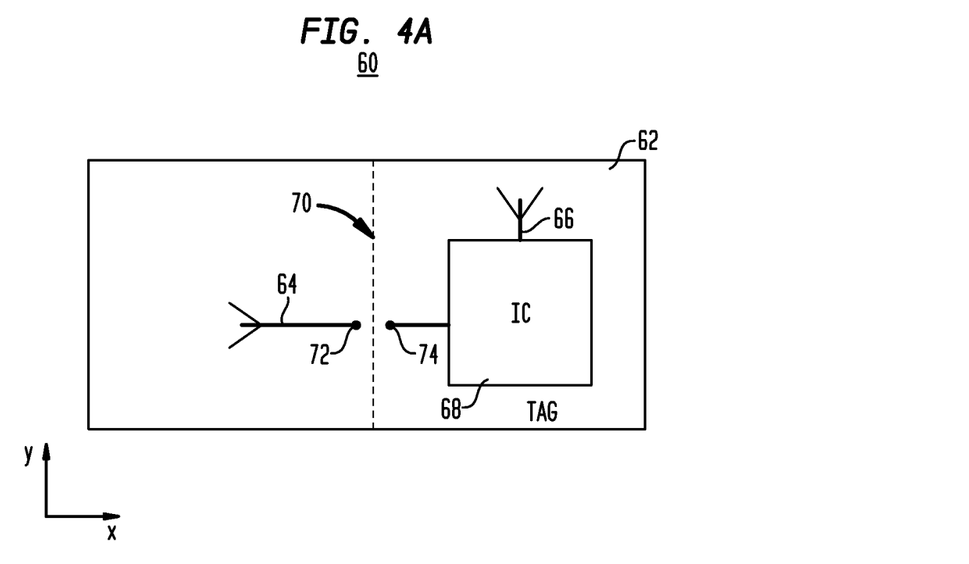
FIGS. 4A and 4B are block diagrams of an exemplary RFID tag.

As shown in FIG. 4A, an exemplary RFID tag 60 includes a base 62. The base 62 includes two orthogonal antennas 64, 66 coupled to an integrated circuit 68. The base also includes a fold 70. Antenna 64 includes conductors 72, 74.

Figure 4B:
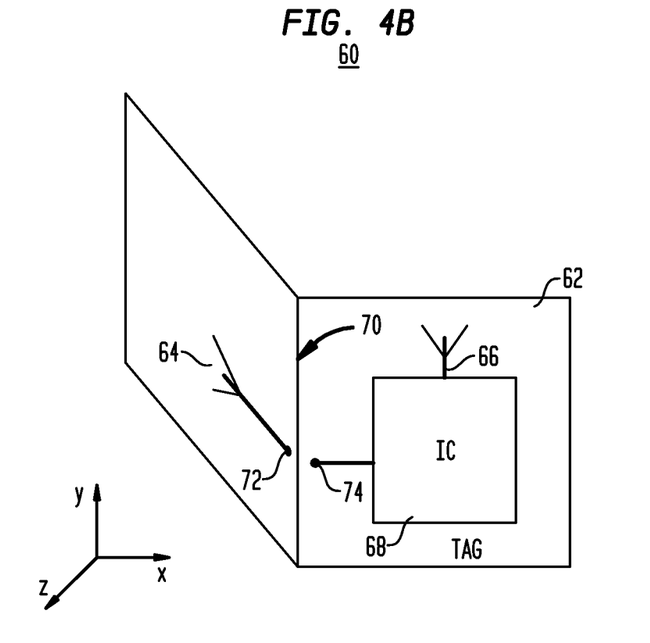

As shown in FIG. 4B, when the base 62 is folded along the fold 70, conductors 72, 74 make electrical contact, completing antenna 64. The conductors 72, 74 can also be used to make a single antenna that is built in two planes. The antenna can be a loop with multiple contact points along edges that are folded together. The conductors 72, 74 can be connected by touching contact or by soldering or by using an adhesive conductor.

Figure 5A:
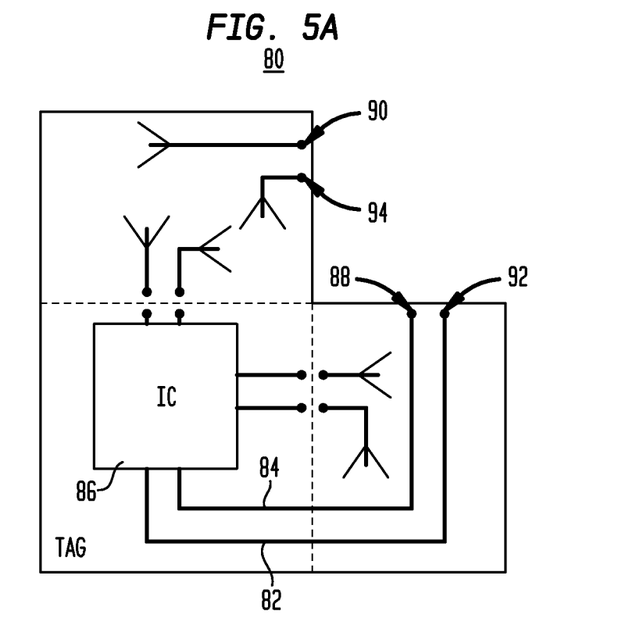
FIGS. 5A and 5B are block diagrams of an exemplary RFID tag.
Figure 5B:
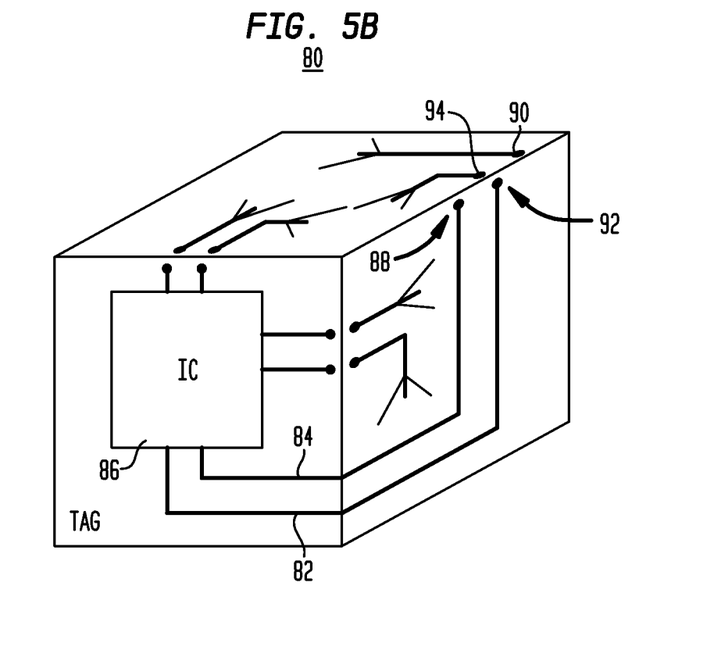

As shown in FIG. 5A, an exemplary RFID tag 80 includes longer antennas 82, 84 coupled to an integrated circuit 86, along with conductors 88, 90, 92, 94. As shown in FIG. 5B, when folded, the conductors 88, 90, 92, 94 make electrical contact and antennas 82, 84 lie in three different planes.

Figure 6A:
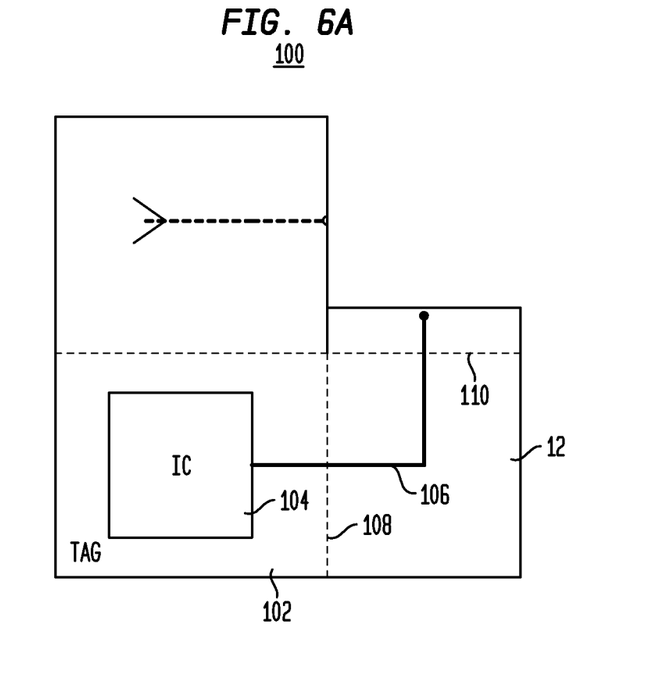
FIGS. 6A and 6B are block diagrams of an exemplary RFID tag.

As shown in FIG. 6A, an exemplary RFID tag 100 includes a base 102. The base 102 includes an integrated circuit 104 coupled to a first portion of an antenna 106. The integrated circuit 104 and first portion of antenna 106 lie on one side of the base 102, and a second portion of antenna 106 lies on a back side of the base 102. The ends of each antenna portion include conductors.

Figure 6B:
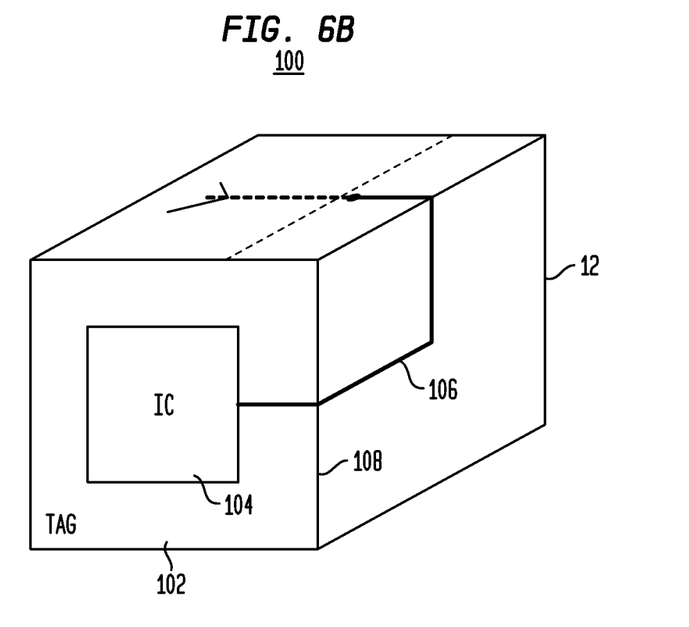

The base 102 also includes two folds 108, 110. As shown in FIG. 6B, when base 102 is folded at folds 108, 110, the first portion of antenna 106, on the side of the tag 100 with the integrated circuit 104, makes electrical contact with the second portion of antenna 106 located on the back side of the base 102. This connection is made by overlapping at the fold causing the conductors to make electrical contact. No via through the base is needed.

Figure 7A:
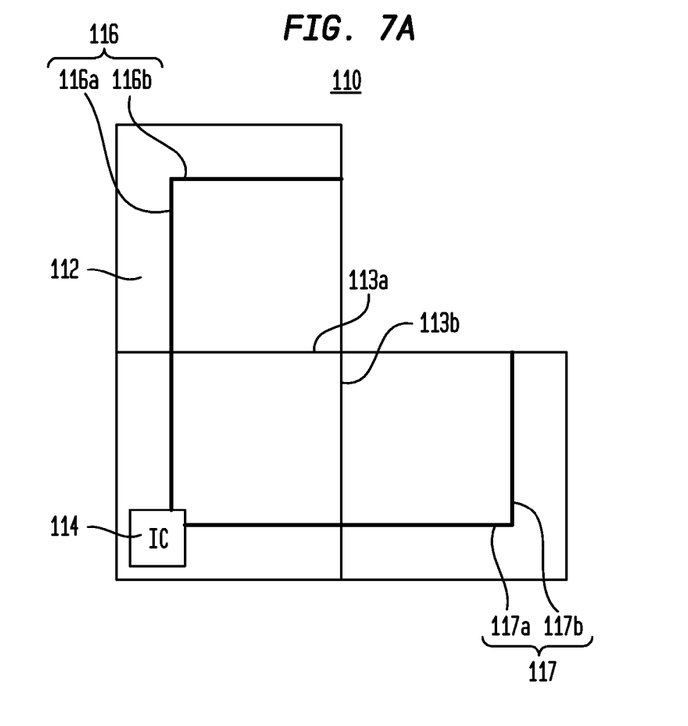
FIGS. 7A and 7B are block diagrams of an exemplary RFID tag.

As shown in FIG. 7A, an exemplary RFID tag 110 includes an L-shaped base 112. A first fold 113a is formed in the base 112 to form a first tab extending from a side of a main body of the base 112, and a second fold 113b is formed in the base 112 to form a second tab extending from an adjacent side of the main body relative to the first fold 113a. The folds 113a, 113b are orthogonal to each other. The base 112 includes an integrated circuit 114 coupled to a first antenna segment 116 and a second antenna segment 117. The first antenna segment 116 includes a first portion 116a that extends from the integrated circuit 114 along the base 112 and over the first fold 113a. The first antenna segment 116 also includes a second portion 116b that orthogonally extends from a free end of the first portion 116a to an edge of the base 112. The second antenna segment 117 includes a first portion 117a that extends from the integrated circuit 114 along the base 112 and over the second fold 113b. The second antenna segment 117 also includes a second portion 117b that orthogonally extends from a free end of the first portion 117a to an edge of the base 112.

Figure 7B:
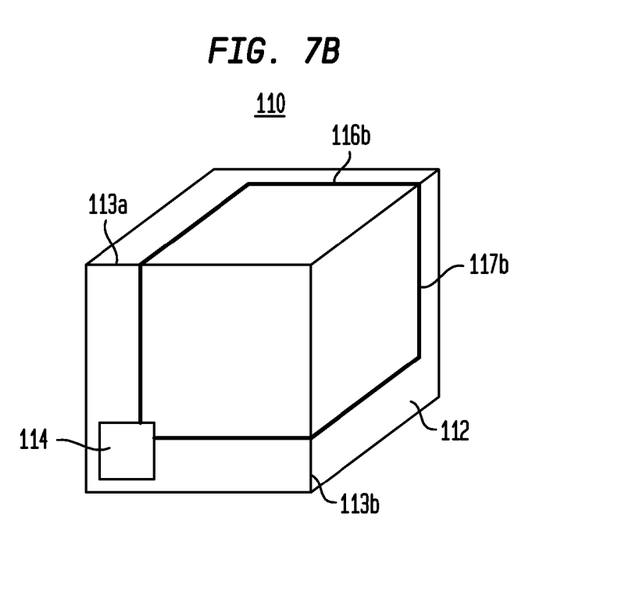

As shown in FIG. 7B, when the base 112 is creased along the folds 113a, 113b, the ends of the second portions 116b, 117b of the antenna segments make electrical contact. The ends of the second portions 116b, 117b of the antenna segments can be connected by touching contact, by soldering or by using an adhesive conductor. As shown in the drawing, the RFID tag 110 is provided on a corner of a box or similarly shaped container such that the base 112 is folded over three orthogonal planes of the container at the corner. Accordingly, the first and second antenna segments 116, 117 comprise a loop antenna formed around the corner of the container and connected to the integrated circuit 114. In some embodiments, the RFID tag 110 is a rigidly formed, cast or molded corner piece such that the folds 113a, 113b are not required.

Figure 8A:
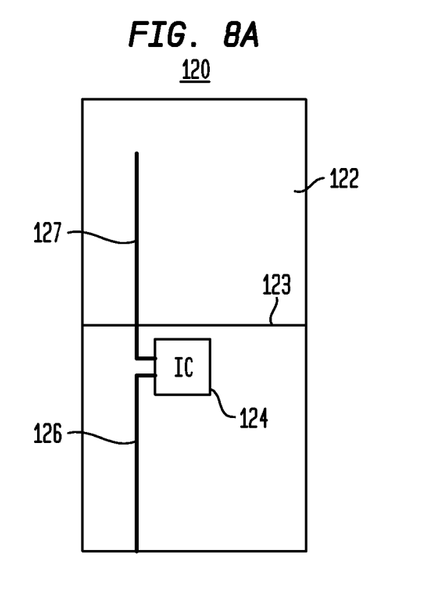
FIGS. 8A and 8B are block diagrams of an exemplary RFID tag.
Figure 8B:
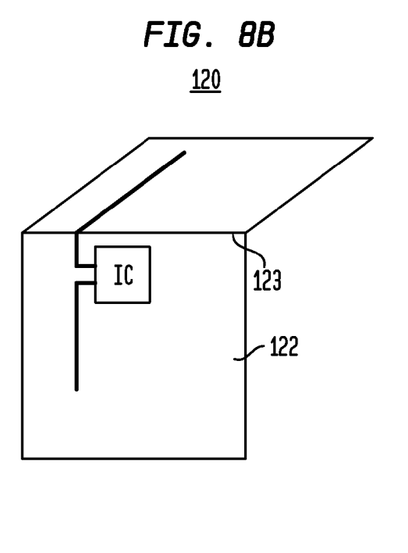

As shown in FIG. 8A, an exemplary RFID tag 120 includes a base 122. A fold 123 is formed in the base 122. An integrated circuit 124 is formed on the base 122 and is coupled to a first antenna segment 126 and a second antenna segment 127 of a dipole antenna. The first antenna segment 126 extends from the integrated circuit 124 to an edge of the base 122. The second antenna segment 127 extends from the integrated circuit 124 and over the fold 123. As shown in FIG. 8B, when the base 123 is creased at the fold 123 (such as when attached to a container along an edge thereof), the second antenna segment 127 extends orthogonally relative to the first antenna segment 126.

Figure 9:
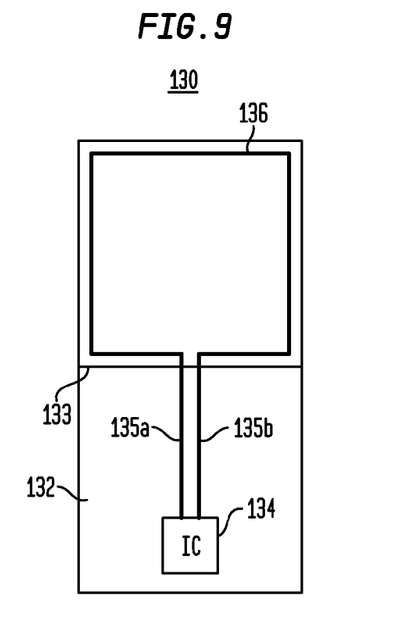
FIG. 9 is a block diagram of an exemplary RFID tag.

As shown in FIG. 9, an exemplary RFID tag 130 includes a base 132. A fold 133 is formed in the base 132. An integrated circuit 134 is formed on the base 132, and two antenna segments 135a, 135b extend from the integrated circuit 134 over the fold 133. Free ends of the antenna segments 135a, 135b are coupled to a loop antenna segment 136 formed on the base 132 on the opposite side of the fold 133 from the integrated circuit 134. When the base 132 is creased along the fold 133 (such as when attached to a container along an edge thereof), the loop antenna segment 136 extends orthogonally relative to the antenna segments 135a, 135b.

Figure 10A:
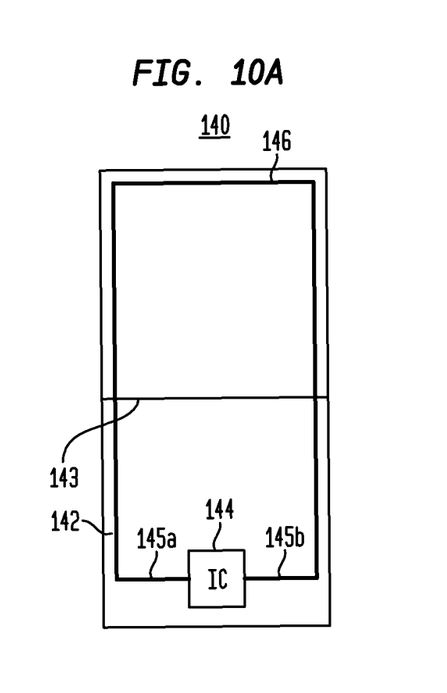
FIGS. 10A and 10B are block diagrams of an exemplary RFID tag.
Figure 10B:
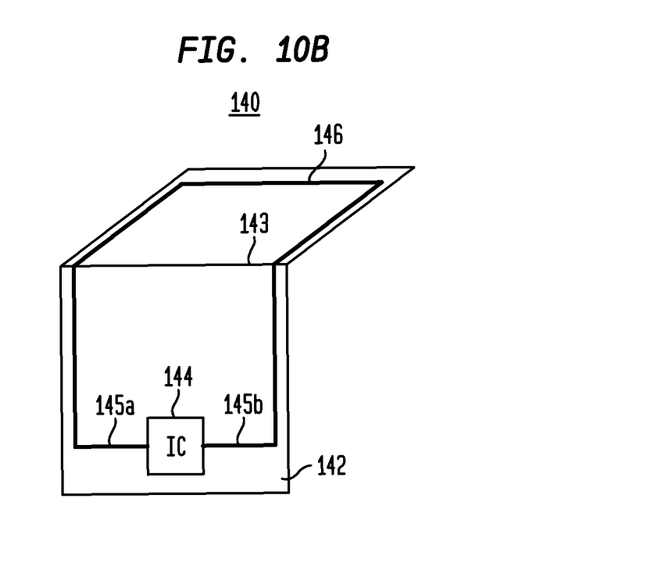

As shown in FIG. 10A, an exemplary RFID tag 140 includes a base 142. A fold 143 is formed in the base 142. An integrated circuit 144 is formed on the base 142, and two L-shaped antenna segments 145a, 145b laterally extend from the integrated circuit 144 over the base 142 toward an edge of the base 142 and then orthogonally to the fold 143. A U-shaped antenna segment 146 is formed on the base 142 on an opposite side of the fold from the integrated circuit 144 such that each free end of the U-shaped antenna segment 146 contacts one of the free ends of the L-shaped antenna segments 145a, 145b at the fold 143 to form a loop antenna. As shown in FIG. 10B, when the base 142 is creased along the fold 143 (such as when attached to a container along an edge thereof), the U-shaped antenna segment 146 extends orthogonally relative to the L-shaped antenna segments 145a, 145b.

Figure 11A:
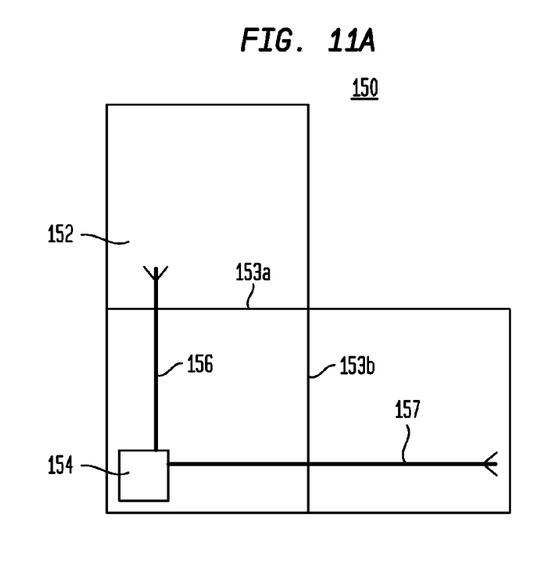
FIGS. 11A and 11B are block diagrams of an exemplary RFID tag.

As shown in FIG. 11A, an exemplary RFID tag 150 includes an L-shaped base 152. A first fold 153a is formed in the base 152 to form a first tab extending from a side of a main body of the base 152, and a second fold 153b is formed in the base 152 to form a second tab extending from an adjacent side of the main body relative to the first fold 153a. The folds 153a, 153b are orthogonal to each other. The base 152 includes an integrated circuit 154 coupled to a first antenna 156 and a second antenna 157. The first antenna 156 linearly extends from the integrated circuit 154 on the base 152 and over the first fold 153a. The second antenna 157 linearly extends from the integrated circuit 154 on the base 152 and over the second fold 153b. The second antenna 157 orthogonally extends from the integrated circuit 154 relative to the first antenna 156.

Figure 11B:
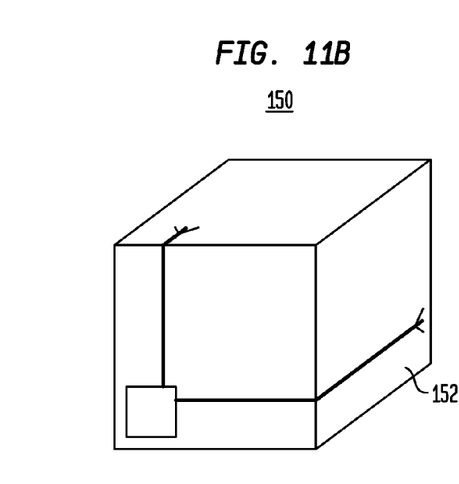

As shown in FIG. 11B, when the base 152 is creased along the fold 153a, a portion of the first antenna 156 on the base 152 on an opposite side of the fold 153a from the integrated circuit 154 is orthogonal to the other portion of the first antenna 156. Similarly, when the base 152 is creased along the fold 153b, a portion if the second antenna 157 on the base 152 on an opposite side of the fold 153b from the integrated circuit 154 is orthogonal to the other portion of the first antenna 157.

Figure 12:
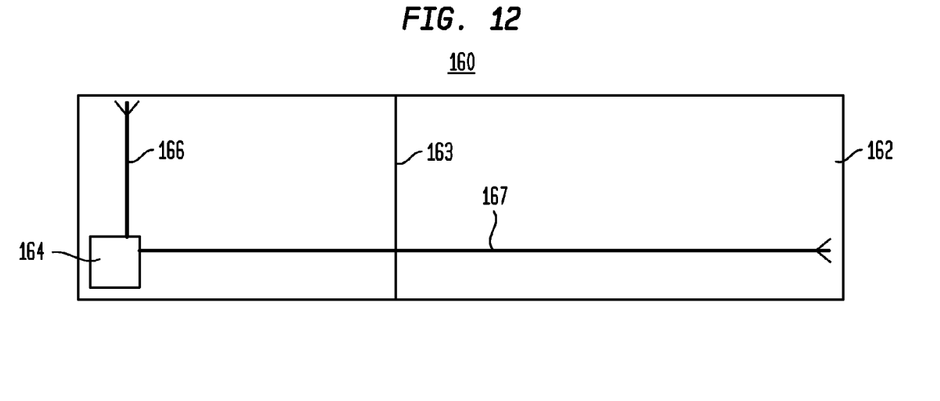
FIG. 12 is a block diagram of an exemplary RFID tag.

As shown in FIG. 12, an exemplary RFID tag 160 includes a base 162. A fold 163 is formed in the base 162. The base 162 includes an integrated circuit 164 coupled to a first antenna 166 and a second antenna 167. The first antenna 166 linearly extends from the integrated circuit 164 toward an edge of the base 162. The second antenna 167 linearly extends from the integrated circuit 164 on the base 162 and over the fold 163. The second antenna 167 orthogonally extends from the integrated circuit 154 relative to the first antenna 166. When the base 162 is creased along the fold 163, a portion of the second antenna 167 on the base 162 on an opposite side of the fold 163 from the integrated circuit 164 extends orthogonally relative to the other portion of the second antenna 166 and relative to the first antenna 166.

The invention can be implemented to realize one or more of the following advantages. A flexible RFID tag can include slits or perforations to enable one flap to cross over another, and in some cases, make electrical contact to the underlying flap. A side fold (or corner) tag can include multiple antennas intended to generate orthogonal radiation patterns.

It is to be understood that the foregoing description is intended to illustrate and not to limit the scope of the invention, which is defined by the scope of the appended claims. Other embodiments are within the scope of the following claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A radio frequency identification (RFID) tag comprising:
an L-shaped base, wherein a first fold is formed in the base to form a first tab on a first free end of the base, and wherein a second fold is formed in the base to form a second tab on a second free end of the base, the first fold being orthogonal to the second fold, wherein the first tab and the second tab extend from adjacent sides of a main body of the base;
an integrated circuit formed on the main body of the base;
a first portion of a first antenna segment formed on the base and extending from the integrated circuit over the first fold;
a second portion of the first antenna segment formed on the first tab, wherein the second portion of the first antenna orthogonally extends from a free end of the first portion of the first antenna segment, a free end of the second portion of the first antenna segment being provided on the first tab;
a first portion of a second antenna segment formed on the base, wherein the first portion of a second antenna segment extends from the integrated circuit over the second fold, wherein the first portion of the second antenna segment is orthogonal to the first portion of the first antenna segment; and
a second portion of the second antenna segment formed on the second tab, wherein the second portion of the second antenna segment orthogonally extends from a free end of the first portion of the second antenna segment, a free end of the second portion of the second antenna segment being provided on the second tab, wherein the second portion of the second antenna segment is orthogonal to the second portion of the first antenna segment.

2. The RFID tag of claim 1 wherein the first fold and the second fold are creased such that the first tab is orthogonal to the main body of the base, the second tab is orthogonal to the main body of the base, and the first tab is orthogonal to the second tab.

3. The RFID tag of claim 1 wherein the first fold and the second fold are creased such that the free end of the second portion of the second antenna segment contacts the free end of the second portion of the first antenna segment.

4. The RFID tag of claim 3 wherein the first antenna segment and the second antenna segment form a loop antenna.

5. A radio frequency identification (RFID) tag comprising:
   a base, wherein a fold is formed in the base, the base comprising a first tab on one side of the fold and a second tab on an opposite side of the fold;
   an integrated circuit formed on the first tab of the base;
   a first antenna segment formed on the base, wherein the first antenna segment extends from the integrated circuit on the first tab and over the fold such that a free end of the first antenna segment is formed on the second tab and a main portion of the first antenna segment is formed on the base; and
   a second antenna segment formed on the first tab of the base, wherein the second antenna segment extends from the integrated circuit in an orthogonal direction relative to the first antenna segment, a free end of the second antenna segment being formed on the first tab,
   wherein the fold is creased such that both the free end of the first antenna segment and the free end of the second antenna segment are orthogonal, or substantially orthogonal, to the fold.

6. The RFID tag of claim 5 wherein the first antenna segment and the second antenna segment form a dipole antenna.

7. A radio frequency identification (RFID) device comprising:
   an L-shaped base, wherein a first fold is formed in the base to form a first tab on a first free end of the base, and wherein a second fold is formed in the base to form a second tab on a second free end of the base, the first fold being orthogonal to the second fold, wherein the first tab and the second tab extend from adjacent sides of a main body of the base;
   an integrated circuit formed on the main body of the base;
   a first antenna extending from the integrated circuit over the first fold, wherein a free end of the first antenna is formed on the first tab; and
   a second antenna extending from the integrated circuit over the second fold, a free end of the second antenna being formed on the second tab, wherein the second antenna is orthogonal to the first antenna.

8. The RFID tag of claim 7 wherein the first fold and the second fold are creased such that the first tab is orthogonal to the main body of the base, the second tab is orthogonal to the main body of the base, and the first tab is orthogonal to the second tab.

9. The RFID tag of claim 7 wherein the first fold and the second fold are creased such that a portion of the first antenna on the first tab is parallel to a portion of the second antenna on the second tab.

10. The RFID tag of claim 7 wherein the first fold is creased such that a portion of the first antenna on the first tab is orthogonal to a portion of the first antenna on the main body of the base.

11. The RFID tag of claim 7 wherein the second fold is creased such that a portion of the second antenna on the second tab is orthogonal to a portion of the second antenna on the main body of the base.

\* \* \* \* \*